(12) United States Patent
Kruglick (10) Patent No.: US 9,183,019 B2
(45) Date of Patent: Nov. 10, 2015

(54) CERTIFICATION FOR FLEXIBLE RESOURCE DEMAND APPLICATIONS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 25 days.

(21) Appl. No.: 13/635,395

(22) PCT Filed: Apr. 25, 2012

(86) PCT No.: PCT/US2012/034986
§ 371 (c)(1),
(2), (4) Date: Sep. 14, 2012

(87) PCT Pub. No.: WO2013/162548
PCT Pub. Date: Oct. 31, 2013

(65) Prior Publication Data
US 2013/0290941 A1    Oct. 31, 2013

(51) Int. Cl.
*G06F 9/455*    (2006.01)
(52) U.S. Cl.
CPC .......... *G06F 9/45516* (2013.01); *G06F 9/4552* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 6,964,042 | B2 * | 11/2005 | Lagergren | 717/153 |
| 8,104,038 | B1 * | 1/2012 | Graupner | 718/104 |
| 2002/0099929 | A1 * | 7/2002 | Jin et al. | 712/220 |
| 2008/0294882 | A1 * | 11/2008 | Murali et al. | 712/241 |
| 2009/0144393 | A1 * | 6/2009 | Kudo | 709/218 |
| 2009/0292602 | A1 | 11/2009 | Pirani | |
| 2009/0292654 | A1 | 11/2009 | Katiyar et al. | |
| 2010/0011446 | A1 | 1/2010 | Klucher et al. | |
| 2010/0122242 | A1 * | 5/2010 | Jiva | 717/148 |
| 2011/0088022 | A1 * | 4/2011 | Kruglick | 717/153 |
| 2012/0102369 | A1 * | 4/2012 | Hiltunen et al. | 714/48 |

OTHER PUBLICATIONS

IBM Developer Kit and Runtime environment, Java Technology Edition, Version 6, Jun. 2009. [retrieved on Jun. 22, 2012]. Retrieved from the Internet: <URL: http://publib.boulder.ibm.com/infocenter/javasdk/v5r0/index.jsp?topic=%2Fcom.ibm.java.doc.diagnostics.50%2Fdiag%2Funderstanding%2Fjit_overview.html>5.

(Continued)

*Primary Examiner* — Li B Zhen
*Assistant Examiner* — Amir Soltanzadeh
(74) *Attorney, Agent, or Firm* — Turk IP Law, LLC (57) ABSTRACT

Technologies are generally provided for optimizing virtual machine performances at a datacenter and managing sudden resource demand changes by co-residing applications on same virtual machines through a flexible resource demand certification approach. A flexible resource demand certificate may be generated for applications including predetermined operating compilation architectures that run well but have different resource demands. A Just-In-Time (JIT) compiler may be directed to selected target settings for a combination of operational parameter settings such that the co-residing applications can share resources without overloading system resources. Applications to be migrated to a new datacenter or a new virtual machine at a datacenter may be assigned and adjusted according to their and potential co-residing applications' certificates providing optimized resource usage.

20 Claims, 7 Drawing Sheets

(56) References Cited

OTHER PUBLICATIONS

Fernando. Autonomous Management in VM-based Resource Providers. Jul. 2009. [retrieved on Jun. 22, 2012]. Retrieved from the Internet: <URL: http://personals.ac.upc.edu/frodrigu/thesis_ferh_full_lectura_screen.pdf>.entire document.

International Search Report and Written Opinion filed on Apr. 25, 2012, mailed on Apr. 25, 2012.

Amazon Machine Images (AMIs), Downloaded from https://aws.amazon.com/amis Sep. 14, 2012.

AWS—Search : Amazon Web Services; Amazon Machine Images (AMIs) Downloaded from http://aws.amazon.com/search?searchPath=amis&searchQuery=java+virtual&x=0&y=0 on Sep. 14, 2012.

International Preliminary Report on Patentability for PCT/US2012/034986 filed Apr. 25, 2012, mailed on Nov. 6, 2014, issued Oct. 28, 2014.

"Amazon EC2 Instance Types," accessed at http://web.archive.org/web/20120208050246/http://aws.amazon.com/ec2/instance-types/, accessed on Sep. 5, 2014, pp. 1-4.

"What is .NET?," accessed at http://web.archive.org/web/20120424130601/http://www.microsoft.com/net, accessed on Sep. 5, 2014, pp. 1-2.

Albonesi, D.H., "Selective Cache Ways: On-Demand Cache Resource Allocation," Proceedings of the International Symposium on Microarchitecture, pp. 248-259 (Nov. 1999).

Bala, V., et al., "Dynamo: A Transparent Dynamic Optimization System," Proceedings of Programming Language Design and Implementation, vol. 35, No. 5, pp. 1-12 (Jun. 2000).

Baraz, L., et al., "IA-32 Execution Layer: a Two-Phase Dynamic Translator Designed to Support IA-32 Applications on Itanium-based Systems," Proceedings of the 36th annual IEEE/ACM International Symposium on Microarchitecture, pp. 11 (2003).

Dehnert, J., et al., "The Transmeta Code Morphing Software: Using Speculation, Recovery, and Adaptive Retranslation to Address Real-Life Challenges", Proceedings of the 1st International Symposium on Code Generation and Optimization, pp. 15-24 (Mar. 27-29, 2003).

Ebcioğlu, K., and Altman, E., "DAISY: Dynamic Compilation for 100% Architectural Compatibility", Proceedings of the 24th International Symposium on Computer Architecture, vol. 25, No. 2, pp. 26-37 (May 1997).

Iyer, R., et al., "Virtual platform architectures for resource metering in datacenters," ACM SIGMETRICS Performance Evaluation Review, vol. 37, No. 2, pp. 89-90 (2009).

Mishra, A. K., et al., "Towards characterizing cloud backend workloads: insights from Google compute clusters," ACM SIGMETRICS Performance Evaluation Review, vol. 37, No. 4, pp. 34-41 (2010).

Nelson, M., et al., "Fast transparent migration for virtual machines," in Proceedings of the annual conference on USENIX Annual Technical Conference, pp. 25-25 (2005).

Rath, J., "Overview: Data Center Infrastructure Management," accessed at http://web.archive.org/web/20120402103031/http://www.datacenterknowledge.com/archives/2011/01/27/overview-data-center-infrastructure-management, posted on Jan. 27, 2011, pp. 1-2.

Rauch, M. et al., "Dynamic adaptive power management for—and by—a Java virtual machine," Technical Report No. 06-19. Donald Bren School of Information and Computer Science (2006).

Simon, H.D., "Parallel Sparse Matrix-Vector Multiplication," CS 267: Applications of Parallel Computers Lecture 17, pp. 1-66 (Oct. 22, 2002).

Wood, T., "Improving Data Center Resource Management, Deployment, and Availability with Virtualization," Computer Science, pp. 58 (Jun. 2009).

\* cited by examiner

CERTIFICATION FOR FLEXIBLE RESOURCE DEMAND APPLICATIONS

CROSS-REFERENCE TO RELATED APPLICATIONS

This Application is the National Stage filing under 35 U.S.C. §371 of PCT Application Ser. No. PCT/US12/34986 filed on Apr. 25, 2012. The PCT Application is herein incorporated by reference in its entirety.

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that can enable access to computing resources at various levels. Cloud-based service providers may provide individuals and organizations with a range of solutions for systems deployment and operation. Depending on customer needs, datacenter capabilities, and associated costs, services provid to customers may be defined by Service Level Agreements (SLAs) describing aspects such as server latency, storage limits or quotas, processing power, scalability factors, backup guarantees, uptime guarantees, resource usage reporting, and similar ones.

Load balancing involves distribution of processes based on their typical long term resource needs in order to balance power usage, hardware duty loads, resource load, and similar system resources. Typically, this is accomplished using coarse profiles of tasks that estimate parameters such as task duration, memory footprint, and processor need. These profiles, however, are just averages over a significant process lifespan and do not capture moment-by-moment dynamic needs and statistical methods may be used to try to assure that maximum needs can likely be met as well. This form of profiling may be suitable in scenarios like moving a virtual machine (VM), which may take about 8-16 seconds for even a moderate size VM so load balancing is not done frequently. This also means that if multiple co-located tasks have peak demand, or simply demand the same particular resources at the same time, service degradation can occur.

Datacenter tasks are more suitable for co-location if they are good "roommates." Resource conflict can cause a significant impact among co-located programs as they make use of the same shared resources. This is especially relevant as more cores move to single servers so that tasks in different virtual machines run at the same time.

SUMMARY

The present disclosure generally describes technologies for employing flexible resource demand certificates for applications in a datacenter environment.

According to some examples, a method for employing flexible resource demand certificates for applications in virtual machine management is provided. The method may include analyzing a flexible resource demand certificate associated with an application; selecting an initial operating point target based on the analysis; and providing operational parameters to a flexible demand manager that is configured to direct a dynamic compiler to targeted settings for the provided operational parameters.

According to other examples, a server for managing flexible resource demand certificates for applications in virtual machine management may include a memory configured to store instructions and a processing unit configured to execute a virtual machine manager in conjunction with the instructions. The virtual machine manager may be configured to analyze a flexible resource demand certificate associated with an application; select a central operating point target based on the analysis; and provide operational parameters to a flexible demand manager that is configured to direct a dynamic compiler to targeted settings for the provided operational parameters.

According to further examples, a computer-readable storage medium may have instructions stored thereon for employing flexible resource demand certificates for applications in virtual machine management. The instructions may include analyzing a flexible resource demand certificate associated with an application; selecting an initial operating point target based on the analysis; and providing operational parameters to a flexible demand manager that is configured to direct a dynamic compiler to targeted settings for the provided operational parameters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to employing flexible resource demand certificates for applications in a datacenter environment.

Briefly stated, technologies are generally provided for optimizing virtual machine performances at a datacenter and managing sudden resource demand changes by co-residing applications on same virtual machines through a flexible resource demand certification approach. A flexible resource demand certificate may be generated for applications including predetermined operating compilation architectures that run well but have different resource demands. A Just-In-Time (JIT) compiler may be directed to selected target settings for a combination of operational parameter settings such that the co-residing applications can share resources without overloading system resources. Applications to be migrated to a new datacenter or a new virtual machine at a datacenter may be assigned and adjusted according to their and potential co-residing applications' certificates providing optimized resource usage.

Figure 1:
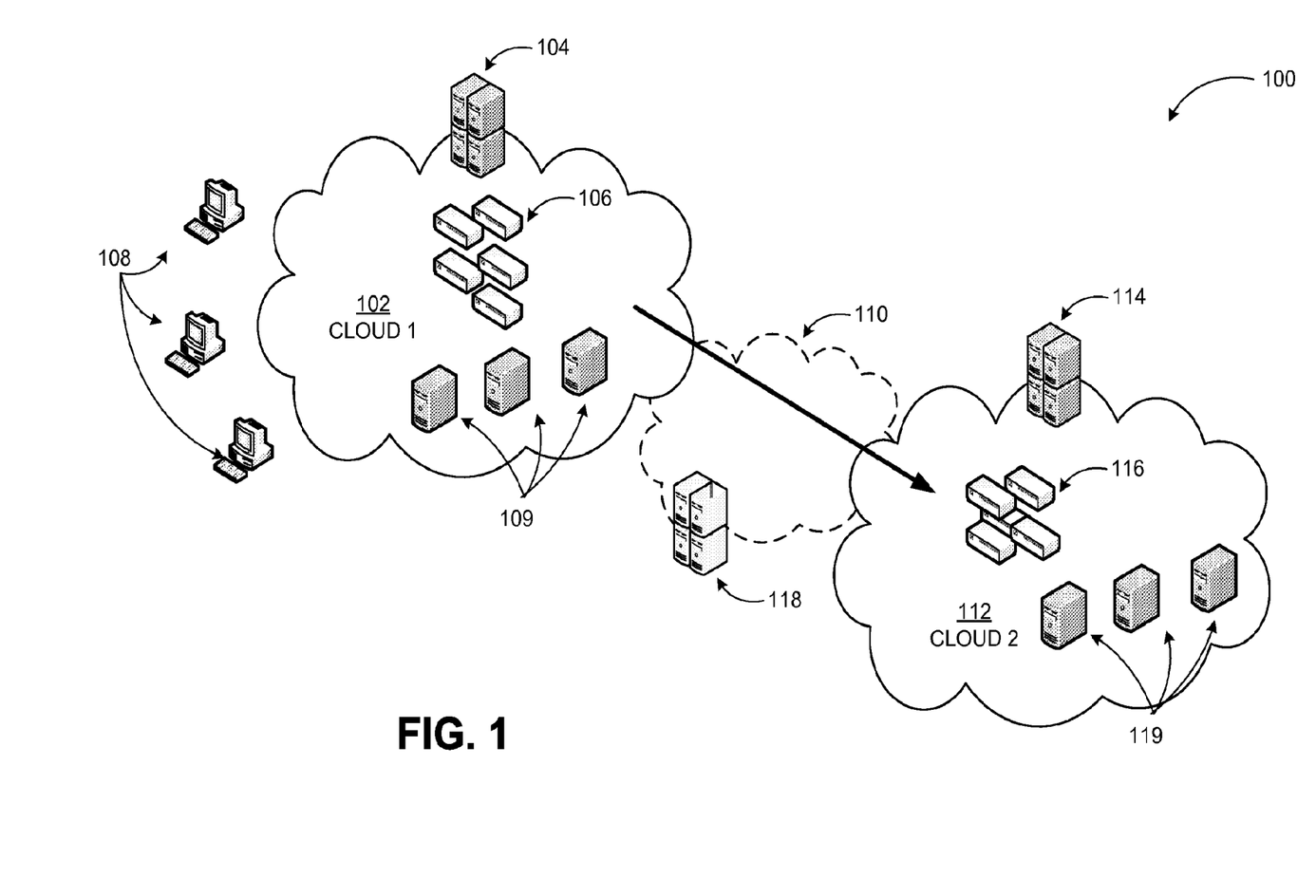
FIG. 1 illustrates an example system, where applications may be certified for flexible resource demand in datacenter environments.

FIG. 1 illustrates an example system, where applications may be certified for flexible resource demand in datacenter environments, arranged in accordance with at least some embodiments described herein.

As shown in a diagram 100, an origin datacenter 102 (cloud 1) may host services such as various applications, data storage, data processing, or comparable ones for individual or enterprise customers 108 and 109. The origin datacenter 102 may employ multiple virtual machines or virtual datacenters providing the services over one or more servers 104. The origin datacenter 102 may also include one or more special purpose devices 106 such as firewalls, routers, physical or virtual data stores, session border controllers, and so on. Thus, an application hosted or data stored by the origin datacenter 102 for a customer may involve a complex architecture of hardware and software components. The service level provided to the customer (owner of the hosted application or data) may be determined based on a number of service parameters such as server processing, memory, and networking, which may be implemented in a particular way by the origin datacenter 102.

In the diagram 100, the origin datacenter 102 (cloud 1) may be a source cloud and a target datacenter 112 (cloud 2) may be a destination cloud in a migration process. Similar to the origin datacenter 102, the target datacenter 112 may also employ one or more servers 114 and one or more special purpose devices 116 to provide its services to individual or enterprise customers 119.

A flexible resource demand certification according to embodiments provides a JIT compiled program with a "good roommate" certificate that may be generated with predetermined operating compilation architectures that run well but have different resource demands. For example, cache may be traded for computation or disk use for processing. The certificate framework may associate predetermined high performing settings with each application so that system managers can control the resource demands. As a result, a datacenter may suddenly and dramatically change resource demands, typically within milliseconds (or about 3 orders of magnitude faster than load balancing), so that resource demands do not conflict. Embodiments enable datacenter management to even be prospective, for example, to reflect the needs of a virtual machine that is about to be co-located with a certificate holder. The certificate based resource management may be managed by the respective datacenters such as the servers 104 at the origin datacenter 102 or the servers 114 at the target datacenter 112. The certification may be performed by the respective datacenters or by a third party such as servers 118 in cloud 110.

Figure 2:
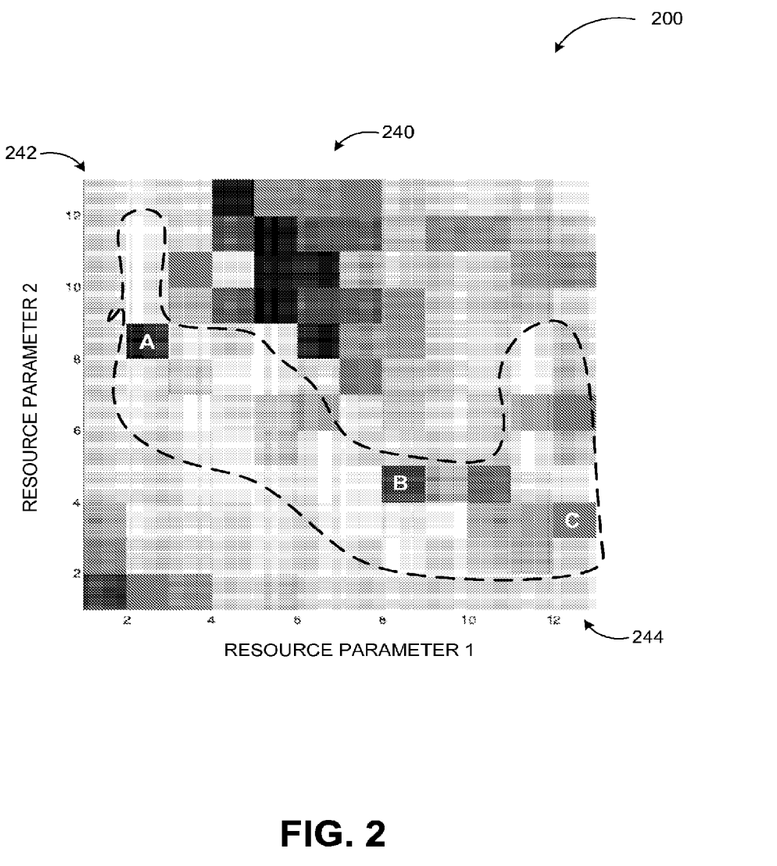
FIG. 2 illustrates an example performance diagram of two resource parameters with example optimization points.

FIG. 2 illustrates an example performance diagram of two resource parameters with example optimization points, arranged in accordance with at least some embodiments described herein.

When various pairs of tasks are co-located on the same hardware, the impact due to shared platform resources such as cache space, memory bandwidth, processor usage, etc. may dramatically reduce overall utilization as one resource or another becomes congested and serves as the limiting factor. The resulting slowdown may range from about 10% to 500%. For example, two tasks with high cache access, such as two matrix comparison functions, may slow each other down by a factor of 5× by constantly refilling the caches, resulting in 5× less efficient processor utilization while the caches churn.

A diagram 200 in FIG. 2 illustrates an example performance plot (color temperature plot) comparing performances of two example parameters: a resource parameter 1 and a resource parameter 2 along horizontal (244) and vertical (242) axes. Of course, a system according to embodiments may employ any number of resource parameters resulting in an N-dimensional comparison.

Several optimization points that consume different resource types may generally be found with approximately equivalent performance: in the example performance plot 240, targeted parameter settings A, B, and C are shown across a two-parameter compilation space of a practical scenario (e.g., cache vs. processing power). A task that does not conflict and cause short-term slowdowns and conflicts may be considered a more benign datacenter resident, and one that needs lower load balancing overhead. In a system according to some embodiments, resource needs of an application may be adjusted at a finer time and resource level than simply moving virtual machines around the datacenter. Well behaved applications that are able to change their resource needs proactively in response to datacenter management messages may be indicated as such by their flexible resource demand certificates.

Memory (cache) usage, processing capacity usage, and data storage are some of the commonly known performance parameters. Another example is application downtime, which may be impacted by pre-transfers and dynamic updating. Load balancing is typically a slow process on the scale of minutes or hours except in the direst emergencies.

Figure 3:
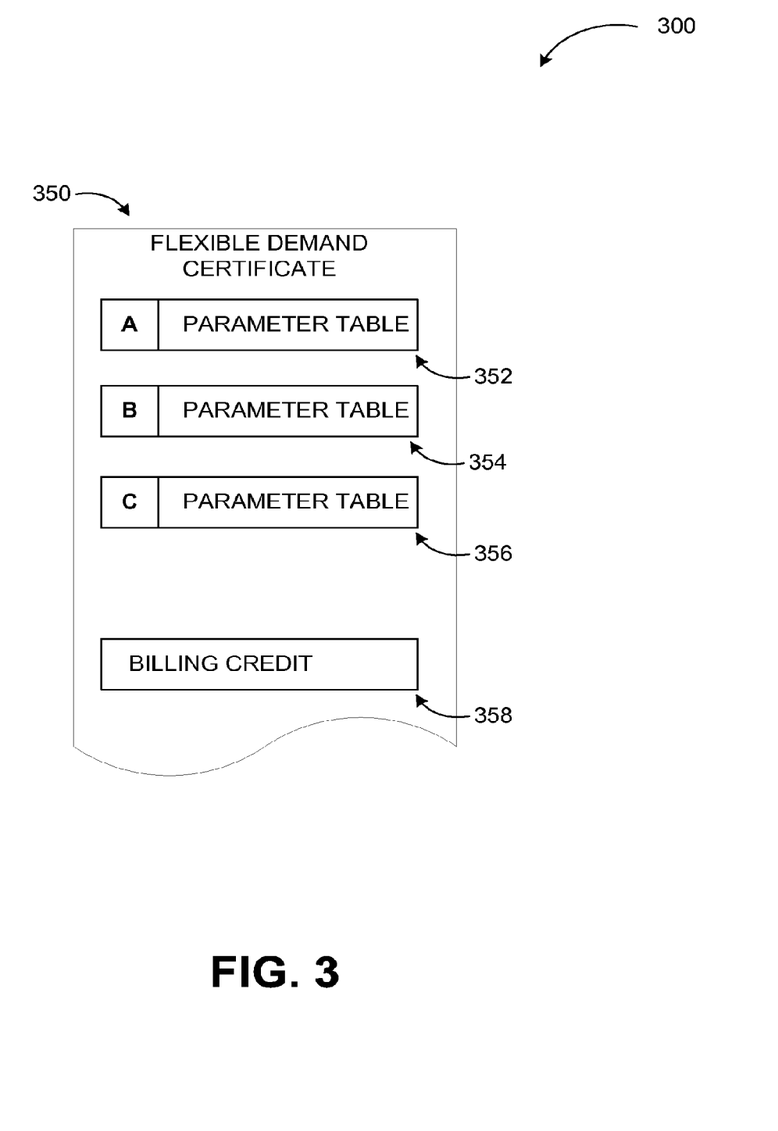
FIG. 3 illustrates conceptually an example flexible resource demand certificate with parameter tables related to the example optimization points of FIG. 2.

FIG. 3 illustrates conceptually an example flexible resource demand certificate with parameter tables related to the example optimization points of FIG. 2, arranged in accordance with at least some embodiments described herein.

In computing, JIT compilation, also known as dynamic translation, is a method to improve the runtime performance of computer programs. Conventional computer programs have two modes of runtime operation, interpreted or static (ahead-of-time) compilation. Interpreted code is translated from a high-level language to a machine code continuously during every execution, whereas statically compiled code is translated into machine code before execution, and only needs this translation once. JIT compilers represent a hybrid approach, with translation occurring continuously, as with interpreters, but with caching of translated code to minimize performance degradation. JIT converts code at runtime prior to executing it natively, for example bytecode into native machine code.

JIT compilation enables customization resulting in improvement of operational performance for a given device or system. JIT systems receive uniform partially compiled binaries or "thin binaries" that are valid across many architectures and operating systems and then have local optimizations that are adjusted to be as specific as desired to the device they are running on. JIT is employed in mobile devices to run apps, in conjunction with web-based applications delivered through browsers, and in datacenters because it allows optimizations to a wider array of hardware configurations with less version management.

Different tunings of a JIT compilation system may result in different balances of memory usage vs. processing power, for example, and thus JIT compilation systems already access known data on memory availability, processor type, and other system parameters. In a system according to embodiments, JIT compilation may be used to optimize performance for co-located tenants that are in another virtual machine or in response to datacenter management commands. Additionally, mapping of different optimal performance areas for each program may not be normally done such that the datacenter can suddenly shift resource demands.

As shown in a diagram 300, a flexible resource demand certificate 350 may include parameter tables 352, 354, 356, etc. for different targeted parameter settings (e.g., optimization points A, B, C of FIG. 2) and optionally billing credit information 358. A dynamically optimized program may be tested across a wide space of compilation options. The parameter space may be N-dimensional and a large number of different optimization points may be selected that operate close to maximum performance. The different optimization points may be saved to a parameter table such as the parameter table 352 for optimization point A, the parameter table 354 for optimization point B, the parameter table 356 for optimization point C, and so on. The parameter tables are part of the flexible demand certificate 350, which may then be associated with the application or machine image. The flexible demand certificate 350 may also include billing credit information to capture discounts for offering flexible demand.

The certificates may be associated with particular virtual machine instances, thus allowing system management information to be associated but available to central management. Having a central system with visibility to the flexible resource demands of many different applications may also enable new levels of control without load balancing VM transfers.

Figure 4:
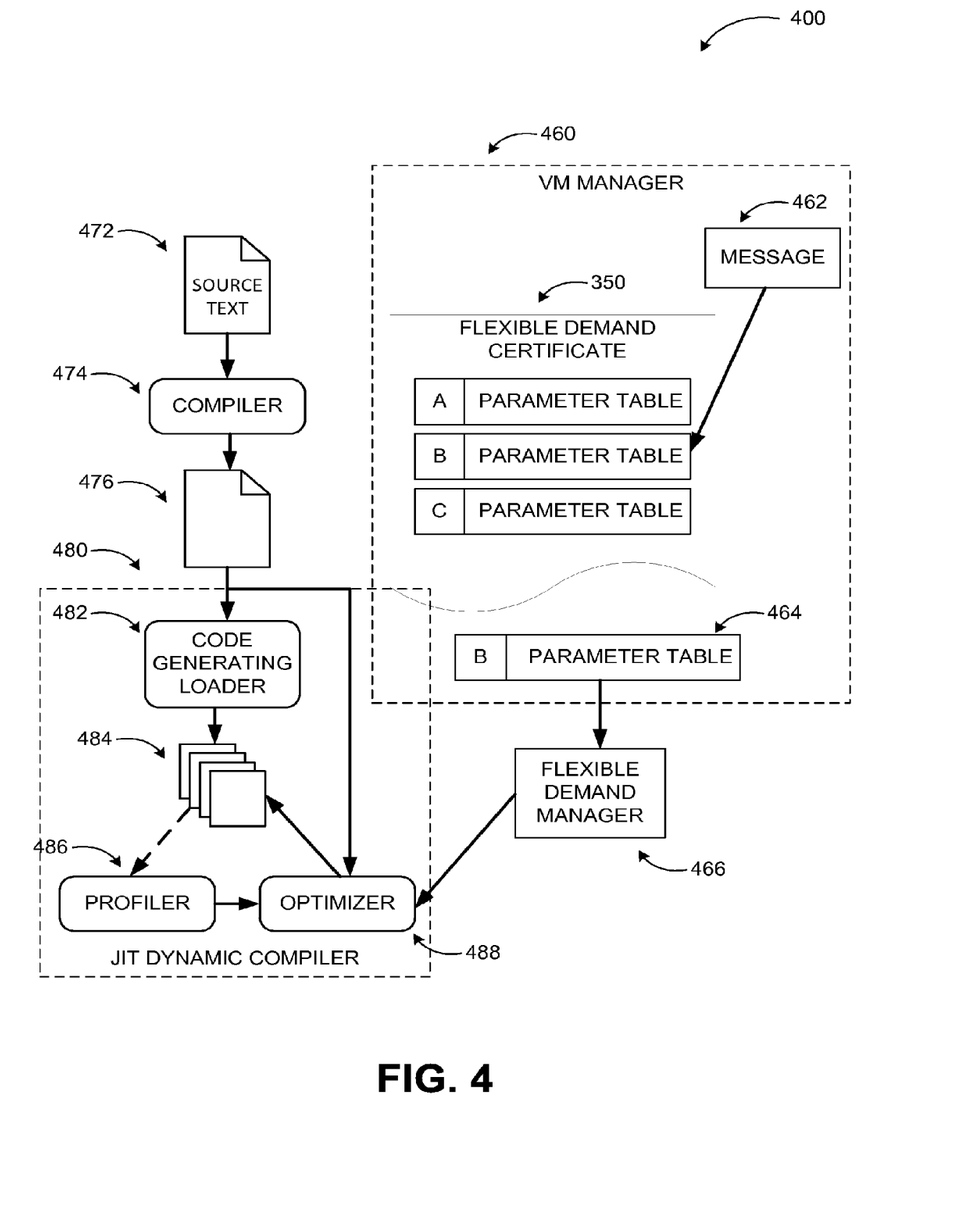
FIG. 4 illustrates a system with JIT dynamic compiler employing a flexible resource demand certificate.

FIG. 4 illustrates a system with JIT dynamic compiler employing a flexible resource demand certificate, arranged in accordance with at least some embodiments described herein.

The overall system shown in a diagram 400 includes a JIT dynamic compiler 480. A message 462 may be sent to a virtual machine (VM) manager 460 to indicate datacenter level optimizations such as an imminent arrival of a new co-located VM. The VM manager 460 may instead make use of the flexible resource capabilities based on observations of the system demands of multiple VMs. Regardless of the input, a flexible demand certificate 350 associated with a specific application may be consulted and an initial operating point target selected. In the example scenario depicted in the diagram 400, targeted parameter settings B may be selected and an associated parameter table 464 may be provided to a flexible demand manager 466. In some examples, the message 462 may be a datacenter infrastructure management (DCIM) message. In place of a DCIM message, load balancing messages, or a local exchange may also be employed based on a VMM optimizing loading (thus, based on local machine status).

Parameters in the parameter table 464 may be provided to the flexible demand manager 466, which directs the JIT dynamic compiler 480 to the targeted parameter settings. An optimization loop in the JIT dynamic compiler 480 comprising a code generating loader 482, an executable code 484, a profiler 486, and an optimizer 488 may take as little as 10-20 milliseconds—three orders of magnitude faster than conventional migration load balancing and at far lower resource usage. The ability to almost instantly jump to operation with changed resource demand may enable drastic reduction of load balancing needs. On the compiler side, the code generating loader 482 may receive a portable intermediate representation (an object file) 476, which is generated by a compiler 474 from source text 472.

One of the considerations in implementing a flexible resource demand certification based system may be how much of a performance penalty may occur when using implementations that are optimized for different algorithm strategies and thus have different resource use profiles. In practical example scenarios, such a penalty may be less than 5%, and in many cases less than 1%.

For illustration purposes, an example function may be considered as follows:

```
function f(x, n)
    for i=1,n do x = math.abs(x) end
    return x
end
```

The example function has an inner and outer loop. The inner loop conducts two hash table loads (G["math"], math ["abs"]), launches a function, and calls a library. Comparing LuaJIT 1.1 (LJ1.1) and LuaJIT 2.0 (LJ2.0) compilation (different versions of the same compiler), results in the following architectural differences in roughly increasing complexity order:

| LJ1.1 | LJ2.0 | |
|---|---|---|
| yes | yes | type-specializes the hash table loads (object and key type). |
| yes* | yes | Inlines both hash table loads (* partially by LJ1). |
| no | yes | Specializes the loads to the hash slot (omit chain loop). |
| yes | yes | Specializes to a monomorphic function dispatch for abs( ). |
| yes | yes | Inlines the abs( ) function. |
| no | yes | Hoists both hash table loads out of the loop. |
| no | yes | Hoists the abs( ) out of the loop (abs(abs(x)) ==> abs(x)). |
| no | yes | Emits an empty loop |

These loops have substantially different execution stacks and memory allotment and usage. For example, one has the hash table loads out of the loop while the other has it in the loop—resulting in far different cache usage. Notably one version omits the chain loop while the other does not, again causing one to use more processor time in place of cache usage.

The altered compilation approach may provide a direct example of the exact same task being directed into two forms—one of which uses memory extensively and one of which trades away memory usage for processor usage. Running these two (different and complimentary) implementations of the same input code may make better utilization of shared hardware while improving performance over running two copies of the same optimized code.

Performance for a particular algorithm unit may be dependent on memory sizes. Thus, completely different compilation implementations may result in an unsubstantial difference in performance, and purposely chosen different optimized architecture points may often have an undetectable difference (e.g., less than 5%) in performance. In a system according to some example embodiments, a flexible resource usage certificate may be attached to processes that allow themselves to be switched among such varied optimum points with different resource demand.

The datacenter may offer modified dynamic compilers capable of accepting messages to alter the optimization point (either in an absolute sense or with a new set of optimizer rules). The messages may be passed as system flags, thread messages, or network messages. The VM manager 460 may manage IP traffic in and out of a VM and may add authenticated messages to the traffic flow that carry messages for the JIT dynamic compiler 480, which may also be modified to receive same. When using network messages, the source of the management does not have to be local meaning that message 462 can be interpreted by a central system that also holds all the resource flexibility certificates. This allows the central system to direct VM co-location to a machine currently running a certified resource flexible application and enables the same central system to prepare the resident application ahead of time by changing the resource mix it uses as the new VM room-mate is being placed.

In some examples, a VM manager of multiple VMs may employ flexible demand on at least one VM task to eliminate or reduce resource conflicts. A user may take advantage of the certificate just by indicating to the datacenter that they wish to, if that user implements a machine image with a datacenter provided JIT compiler, which needs to include the flexible demand manager 466. The datacenter can then wait for a time when ample resources are available (to ensure good performance) and vary the control parameters to explore a large optimization space and determine suitable operating points to generate the flexible resource certificate described here.

To incentivize users, billing credits may be issued that are at least enough to offset any performance penalty so that a user is not penalized for being resource flexible, although this may often be an undetectable amount. Since the certificate is used to allow management systems to have flexible resource operating points, the certificate may also store billing information such as incentives, which may be communicated to the datacenter billing manager when appropriate.

Figure 5:
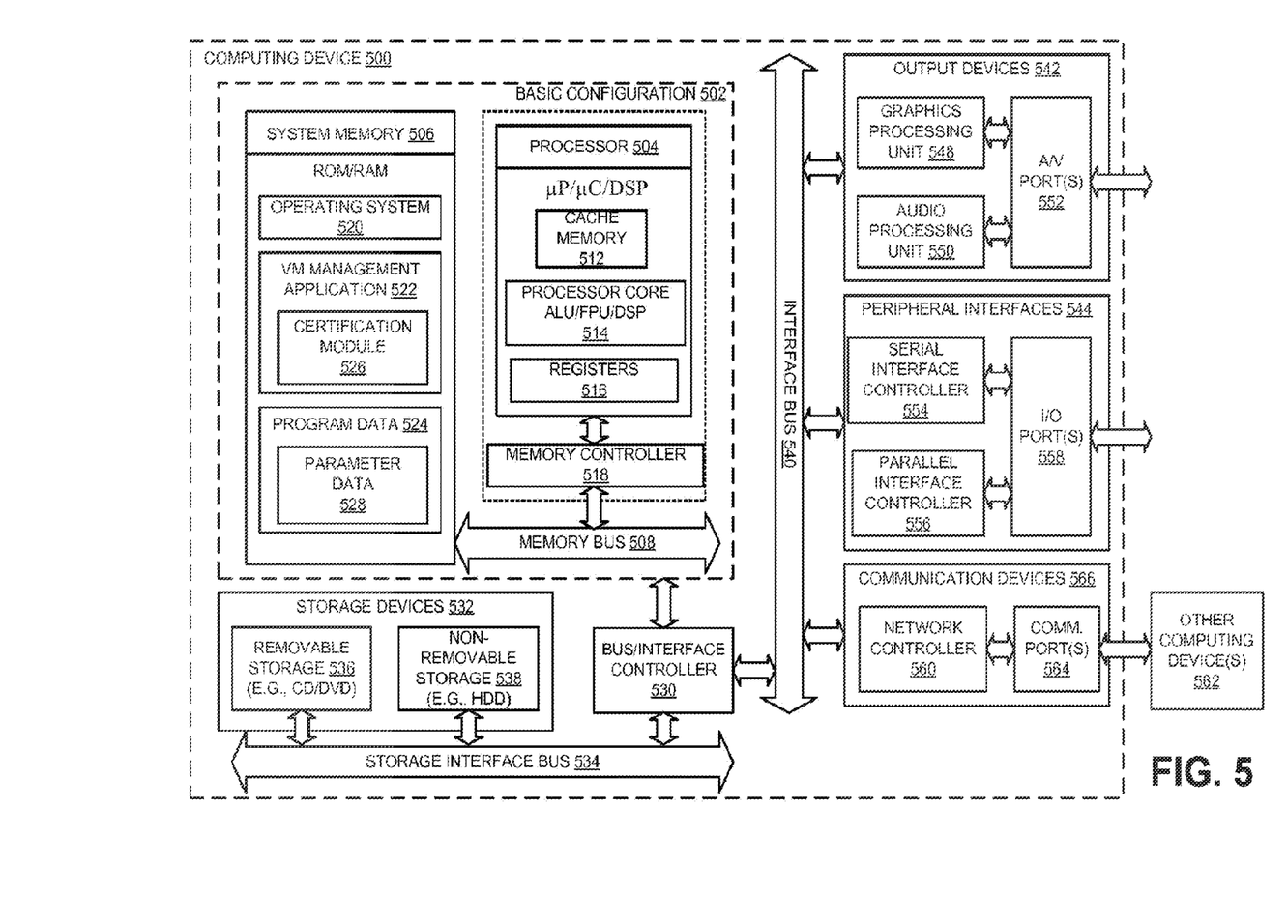
FIG. 5 illustrates a general purpose computing device, which may be used to employ certificates for flexible resource demand in datacenter environments.

FIG. 5 illustrates a general purpose computing device, which may be used to employ certificates for flexible resource demand in datacenter environments, arranged in accordance with at least some embodiments described herein. For example, the computing device 500 may be used as servers 104, 114, or 118 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications such as virtual machine management application 522, and program data 524. The virtual machine management application 522 may be part of a datacenter management service and include a certification module 526, which may employ flexible resource demand certificates for applications in a datacenter environment as described herein. The program data 524 may include, among other data, parameter data 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
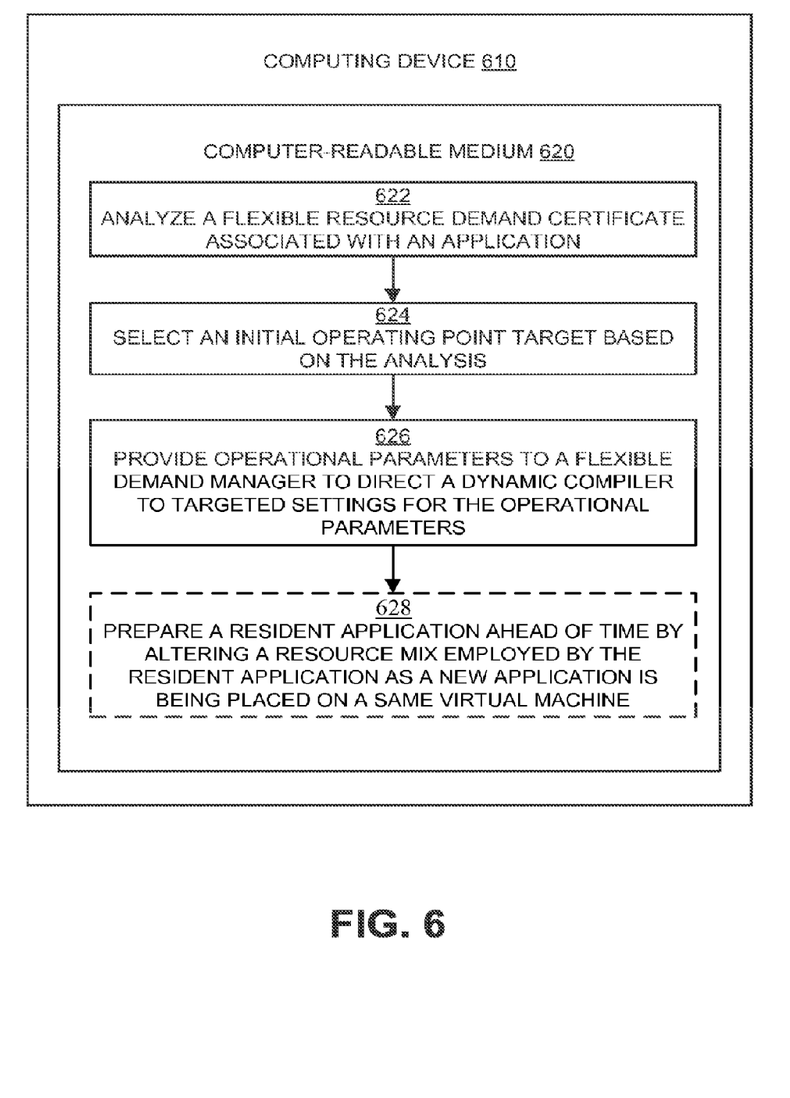
FIG. 6 is a flow diagram illustrating an example method that may be performed by a computing device such as the device in FIG. 5.

FIG. 6 is a flow diagram illustrating an example method that may be performed by a computing device such as the computing device 500 in FIG. 5, arranged in accordance with at least some embodiments described herein. Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process for employing flexible resource demand certificates for applications in a datacenter environment may begin with block 622, "ANALYZE A FLEXIBLE RESOURCE DEMAND CERTIFICATE ASSOCIATED WITH AN APPLICATION", where a certification module or application (e.g., the certification module 526) executed on a server (e.g., the servers 104, 118, or 114 of FIG. 1) may analyze a resource demand certification determining resource demands for the application associated with the certificate for various operational parameters.

Block 622 may be followed by block 624, "SELECT AN INITIAL OPERATING POINT TARGET BASED ON THE ANALYSIS", where the virtual machine management application 522 of FIG. 5 may determine the central operating point target based on the operational parameters and resource demands for different combinations.

Block 624 may be followed by block 626, "PROVIDE OPERATIONAL PARAMETERS TO A FLEXIBLE DEMAND MANAGER TO DIRECT A DYNAMIC COMPILER TO TARGETED SETTINGS FOR THE OPERATIONAL PARAMETERS", where the operational parameters may be provided to the flexible demand manager 466 such that the flexible demand manager 466 may manage the JIT dynamic compiler 480 to the targeted settings for optimal target settings.

Block 626 may be followed by optional block 628, "PREPARE A RESIDENT APPLICATION AHEAD OF TIME BY ALTERING A RESOURCE MIX EMPLOYED BY THE RESIDENT APPLICATION AS A NEW APPLICATION IS BEING PLACED ON A SAME VIRTUAL MACHINE", where a resident application may be prepared before a new application is placed on the same virtual machine as the resident application by the virtual machine management application 522.

The blocks included in the above described process are for illustration purposes. Employing flexible resource demand certificates for applications in a datacenter environment may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
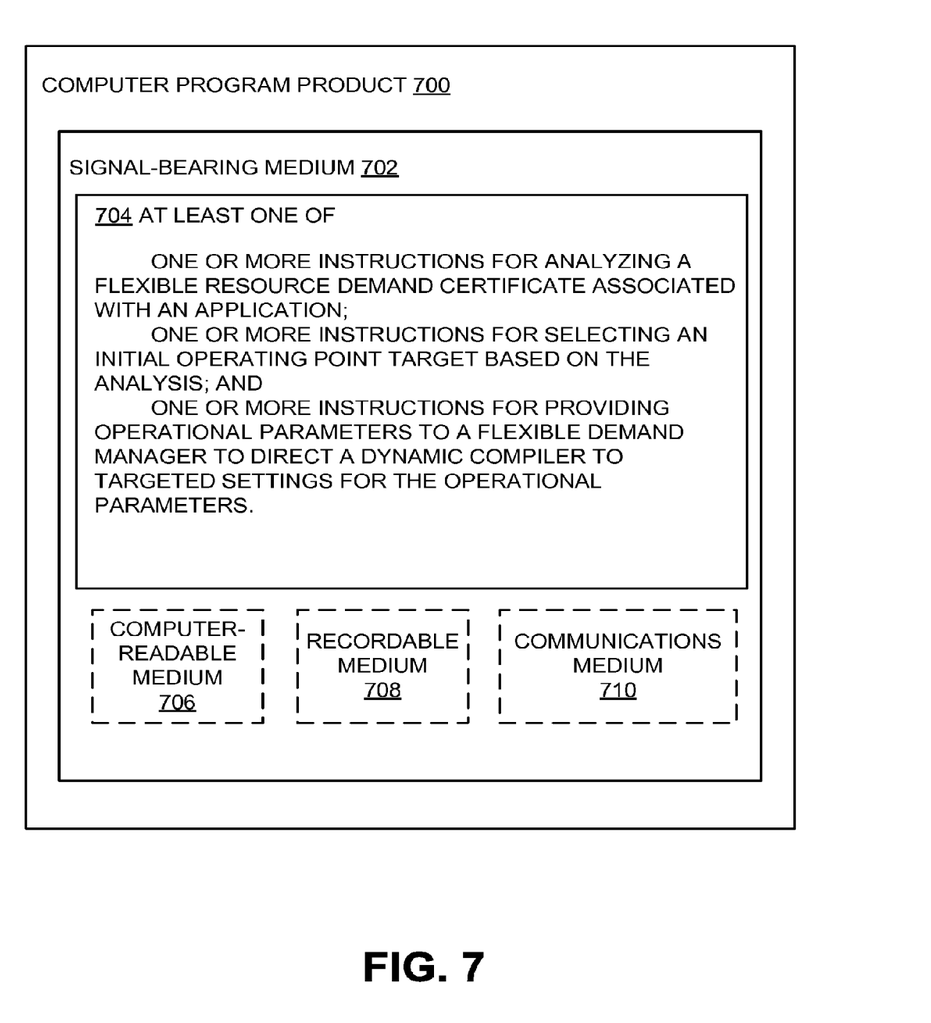
FIG. 7 illustrates a block diagram of an example computer program product, all arranged in accordance with at least some embodiments described herein.

FIG. 7 illustrates a block diagram of an example computer program product arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the certification module 526 may undertake one or more of the tasks shown in FIG. 7 in response to the instructions 704 conveyed to the processor 504 by the medium 702 to perform actions associated with employing flexible resource demand certificates for applications in a datacenter environment as described herein. Some of those instructions may include, for example, instructions for analyzing a flexible resource demand certificate associated with an application; selecting an initial operating point target based on the analysis; and providing operational parameters to a flexible demand manager to direct a dynamic compiler to targeted settings for the operational parameters according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for employing flexible resource demand certificates for applications in virtual machine management is provided. The method may include analyzing a flexible resource demand certificate associated with an application; selecting an initial operating point target based on the analysis; and providing operational parameters to a flexible demand manager that is configured to direct a dynamic compiler to targeted settings for the provided operational parameters.

According to other examples, the targeted settings for the operational parameters may be established in an optimization loop of a Just-In-Time compilation at runtime. The optimization may be based on one or more of co-located tenants in a virtual machine that are in distinct operating systems or in response to a datacenter management command. The operational parameters may be associated with one or more of a memory availability, a processor type, a number of available processors, and/or a power consumption. The flexible resource demand certificate may provide a mapping of different optimal performance areas for the application to enable shifting resource demands rapidly.

According to further examples, the method may include selecting the operational parameters from an N-dimensional parameter space and selecting different optimization points to operate substantially near a maximum performance. The optimization points may be included in a parameter table within the flexible resource demand certificate. The dynamic compiler may be configured to accept messages to alter the optimization points. The messages may be passed as one or more of system flags, thread messages, and/or network messages. The messages may be datacenter infrastructure management (DCIM) messages, load balancing messages, or local exchange messages from virtual machine management that are interpreted by a central system that also holds the flexible resource demand certificates for a datacenter.

According to yet other examples, the method may include enabling the central system to prepare a resident application ahead of time by altering a resource mix employed by the resident application as a new application is being placed on a same virtual machine as the resident application. The flexible resource demand certificates may be associated with one or more virtual machine instances. The method may also include receiving an indication to employ the flexible resource demand certificate and when resources are available to ensure optimized performance, varying control parameters to explore an optimization space and determining suitable operating points to generate the flexible resource demand certificate. The method may further include providing a billing credit to a user to offset a performance penalty such that the user is not penalized for being resource flexible, where the flexible resource demand certificate further includes billing credit information to capture discounts for offering flexible demand. The method may also include communicating the billing credit information to a billing manager.

According to other examples, a server for managing flexible resource demand certificates for applications in virtual machine management may include a memory configured to store instructions and a processing unit configured to execute a virtual machine manager in conjunction with the instructions. The virtual machine manager may be configured to analyze a flexible resource demand certificate associated with an application; select an initial operating point target based on the analysis; and provide operational parameters to a flexible demand manager that is configured to direct a dynamic compiler to targeted settings for the provided operational parameters.

According to some examples, the targeted settings for the operational parameters may be established in an optimization loop of a Just-In-Time compilation at runtime. The optimization may be based on one or more of co-located tenants in a virtual machine that are in distinct operating systems and in response to a datacenter management command. The operational parameters may be associated with one or more of a memory availability, a processor type, a number of available processors, and/or a power consumption. The flexible resource demand certificate may provide a mapping of different optimal performance areas for the application to enable shifting resource demands rapidly.

According to further examples, the virtual machine manager may be further configured to select the operational parameters from an N-dimensional parameter space and select different optimization points to operate substantially near a maximum performance. The optimization points may be included in a parameter table within the flexible resource demand certificate. The dynamic compiler may be configured to accept messages to alter the optimization points. The messages may be passed as one or more of system flags, thread messages, and/or network messages. The messages may be datacenter infrastructure management (DCIM) messages, load balancing messages, or local exchange messages from virtual machine management that are interpreted by a central system that also holds the flexible resource demand certificates for a datacenter.

According to yet other examples, the virtual machine manager may be further configured to enable the central system to prepare a resident application ahead of time by altering a resource mix employed by the resident application as a new application is being placed on a same virtual machine as the resident application, where the flexible resource demand certificates are associated with one or more virtual machine instances. The virtual machine manager may also be further configured to receive an indication to employ the flexible resource demand certificate and when resources are available to ensure optimized performance, vary control parameters to explore an optimization space and determine suitable operating points to generate the flexible resource demand certificate. The virtual machine manager may provide a billing credit to a user to offset a performance penalty such that the user is not penalized for being resource flexible. The flexible resource demand certificate may further include billing credit information to capture discounts for offering flexible demand. The virtual machine manager may be further configured to communicate the billing credit information to a billing manager and employ flexible resource capabilities based on observations of system demands of multiple virtual machines.

According to further examples, a computer-readable storage medium may have instructions stored thereon for employing flexible resource demand certificates for applications in virtual machine management. The instructions may include analyzing a flexible resource demand certificate associated with an application; selecting an initial operating point target based on the analysis; and providing operational parameters to a flexible demand manager that is configured to direct a dynamic compiler to targeted settings for the provided operational parameters.

According to other examples, the targeted settings for the operational parameters may be established in an optimization loop of a Just-In-Time compilation at runtime. The optimization may be based on one or more of co-located tenants in a virtual machine that are in distinct operating systems and in response to a datacenter management command. The operational parameters may be associated with one or more of a memory availability, a processor type, a number of available processors, and/or a power consumption. The flexible resource demand certificate may provide a mapping of different optimal performance areas for the application to enable shifting resource demands rapidly.

According to further examples, the instructions may include selecting the operational parameters from an N-dimensional parameter space and selecting different optimization points to operate substantially near a maximum performance. The optimization points may be included in a parameter table within the flexible resource demand certificate. The dynamic compiler may be configured to accept messages to alter the optimization points. The messages may be passed as one or more of system flags, thread messages, and/or network messages. The messages may be datacenter infrastructure management (DCIM) messages, load balancing messages, or local exchange messages from virtual machine management that are interpreted by a central system that also holds the flexible resource demand certificates for a datacenter.

According to yet other examples, the instructions may include enabling the central system to prepare a resident application ahead of time by altering a resource mix employed by the resident application as a new application is being placed on a same virtual machine as the resident application. The flexible resource demand certificates may be associated with one or more virtual machine instances. The instructions may also include receiving an indication to employ the flexible resource demand certificate and when resources are available to ensure optimized performance, varying control parameters to explore an optimization space and determining suitable operating points to generate the flexible resource demand certificate. The instructions may further include providing a billing credit to a user to offset a performance penalty such that the user is not penalized for being resource flexible, where the flexible resource demand certificate further includes billing credit information to capture discounts for offering flexible demand. The instructions may also include communicating the billing credit information to a billing manager.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to employ flexible resource demand certificates for applications in virtual machine management, the method comprising:
   in response to receiving a message that indicates an imminent arrival of an application scheduled to migrate to a virtual machine of a datacenter, analyzing, by a virtual machine manager, a flexible resource demand certificate associated with a resident application of the virtual machine to determine resource demands for the resident application for one or more operational parameters, wherein the flexible resource demand certificate includes indications of predetermined operational compilation architectures for the resident application that are complimentary but include different resource demands such that the resource demands are altered to prevent the resource demands from conflicting upon arrival of the application;
   selecting, by the virtual machine manager, an initial operating point target based on the analysis;
   providing, by a virtual machine manager, the operational parameters to a flexible demand manager that is configured to direct a dynamic compiler to targeted settings for the provided operational parameters, wherein the targeted settings for the operational parameters are established in an optimization loop of a Just-In-Time compilation at runtime, and a compilation approach of the dynamic compiler is altered such that the resident application is directed into two forms, each of the two forms comprising an inner loop and an outer loop having substantially different execution stacks and memory allotment and usage that are employed in a different manner by each of the two forms, wherein a first form uses memory extensively and a second form trades memory usage for processor usage; and preparing, by the virtual machine manager, the resident application by altering the resource demands for the resident application with the established targeted settings for the one or more operational parameters prior to the application migrating to the virtual machine.

2. The method according to claim 1, wherein the Just-In-Time compilation is used to optimize performance for co-located tenants in the virtual machine that are in distinct operating systems or in response to a datacenter management command.

3. The method according to claim 1, wherein the operational parameters are associated with one or more of a memory availability, a processor type, a number of available processors, or a power consumption.

4. The method according to claim 1, wherein the flexible resource demand certificate provides a mapping of different optimal performance areas for the application to enable shifting resource demands rapidly.

5. The method according to claim 1, further comprising:
selecting the operational parameters from an N-dimensional parameter space; and
selecting different optimization points to operate substantially near a maximum performance.

6. The method according to claim 1, wherein the flexible resource demand certificates are associated with one or more virtual machine instances.

7. The method according to claim 1, further comprising:
receiving an indication to employ the flexible resource demand certificate; and
when resources are available to ensure optimized performance, varying control parameters to explore an optimization space and determining suitable operating points to generate the flexible resource demand certificate.

8. The method according to claim 7, further comprising:
providing a billing credit to a user to offset a performance penalty such that the user is not penalized for being resource flexible.

9. A server to manage flexible resource demand certificates for applications in virtual machine management, the server comprising:
a memory configured to store instructions; and
a processing unit configured to execute a virtual machine manager in conjunction with the instructions, wherein the virtual machine manager is configured to:
analyze a flexible resource demand certificate associated with an application, wherein the flexible resource demand certificate includes indications of predetermined operational compilation architectures for the application that are complimentary but include different resource demands such that the resource demands are altered to prevent the resource demands from conflicting;
select an initial operating point target based on the analysis;
select operational parameters from an N-dimensional parameter space;
select different optimization points to operate substantially near a maximum performance;
provide the operational parameters to a flexible demand manager that is configured to direct a dynamic compiler to targeted settings for the provided operational parameters; and
alter a compilation approach of the dynamic compiler such that a same application is directed into two forms, each of the two forms comprising an inner loop and an outer loop having substantially different execution stacks and memory allotment and usage that are employed in a different manner by each of the two forms, wherein a first form uses memory extensively and a second form trades memory usage for processor usage.

10. The server according to claim 9, wherein the targeted settings for the operational parameters are established in an optimization loop of a Just-In-Time compilation at runtime.

11. The server according to claim 9, wherein the optimization points are included in a parameter table within the flexible resource demand certificate.

12. The server according to claim 9, wherein the dynamic compiler is configured to accept messages to alter the optimization points.

13. The server according to claim 12, wherein the messages are passed as one or more of system flags, thread messages, or network messages.

14. The server according to claim 12, wherein the messages are one of datacenter infrastructure management (DCIM) messages, load balancing messages, or local exchange messages from virtual machine management that are interpreted by a central system that also holds the flexible resource demand certificates for a datacenter.

15. The server according to claim 14, wherein the virtual machine manager is further configured to:
enable the central system to prepare a resident application ahead of time by altering a resource mix employed by the resident application as a new application is being placed on a same virtual machine as the resident application.

16. The server according to claim 9, wherein the flexible resource demand certificates are associated with one or more virtual machine instances.

17. The server according to claim 9, wherein the virtual machine manager is further configured to:
receive an indication to employ the flexible resource demand certificate; and
when resources are available to ensure optimized performance, vary control parameters to explore an optimization space and determine suitable operating points to generate the flexible resource demand certificate.

18. The server according to claim 17, wherein the virtual machine manager is further configured to:
provide a billing credit to a user to offset a performance penalty such that the user is not penalized for being resource flexible.

19. A non-transitory computer-readable storage medium having instructions stored thereon to employ flexible resource demand certificates for applications in virtual machine management, the instructions comprising:
in response to receiving a message that indicates an imminent arrival of an application scheduled to migrate to a virtual machine of a datacenter, analyzing a flexible resource demand certificate associated with a resident application of the virtual machine to determine resource demands for the resident application for one or more operational parameters, wherein the flexible resource demand certificate includes indications of predetermined operational compilation architectures for the resident application that are complimentary but include different resource demands such that the resource demands are altered to prevent the resource demands from conflicting upon arrival of the application, and is associated with an instance of the virtual machine allowing resource demand information to be associated with the virtual machine, while further being available to a central management system such that the central management system has visibility to resource demands of multiple applications to enable new levels of resource demand control without load balancing virtual machine transfers;

selecting an initial operating point target based on the analysis;

providing the one or more operational parameters to a flexible demand manager that is configured to direct a dynamic compiler to targeted settings for the provided operational parameters, wherein the targeted settings for the one or more operational parameters are established in an optimization loop of a Just-In-Time compilation at runtime, and a compilation approach of the dynamic compiler is altered such that the resident application is directed into two forms, each of the two forms comprising an inner loop and an outer loop having substantially different execution stacks and memory allotment and usage that are employed in a different manner by each of the two forms, wherein a first form uses memory extensively and a second form trades memory usage for processor usage; and preparing the resident application by altering the resource demands for the resident application with the established targeted settings for the one or more operational parameters prior to the application migrating to the virtual machine.

20. The non-transitory computer-readable storage medium according to claim 19, wherein the instructions further comprise:

receiving an indication to employ the flexible resource demand certificate;

when resources are available to ensure optimized performance, varying control parameters to explore an optimization space and determining suitable operating points to generate the flexible resource demand certificate; and providing a billing credit to a user to offset a performance penalty such that the user is not penalized for being resource flexible, wherein the flexible resource demand certificate further includes billing credit information to capture discounts for offering flexible demand.

* * * * *

UNITED STATES PATENT AND TRADEMARK OFFICE
CERTIFICATE OF CORRECTION

| | | |
|---|---|---|
| PATENT NO. | : 9,183,019 B2 | Page 1 of 1 |
| APPLICATION NO. | : 13/635395 | |
| DATED | : November 10, 2015 | |
| INVENTOR(S) | : Kruglick | |

It is certified that error appears in the above-identified patent and that said Letters Patent is hereby corrected as shown below:

In the specification,

In Column 1, Lines 7-8, delete "under 35 U.S.C. §371" and insert -- under 35 U.S.C. § 371 --, therefor.

In Column 1, Lines 25-26, delete "services provid" and insert -- services provided --, therefor.

Signed and Sealed this
Twenty-third Day of February, 2016

Michelle K. Lee
*Director of the United States Patent and Trademark Office*